US005357831A

United States Patent [19]

Michalik

[11] Patent Number: 5,357,831

[45] Date of Patent: Oct. 25, 1994

[54] CROSSCUTTING DEVICE

[75] Inventor: Horst B. Michalik, Hoechberg, Fed. Rep. of Germany

[73] Assignee: Koenig & Bauer Aktiengesellschaft, Wurzburg, Fed. Rep. of Germany

[21] Appl. No.: 107,315

[22] Filed: Aug. 17, 1993

Related U.S. Application Data

[62] Division of Ser. No. 907,070, Jul. 1, 1992, Pat. No. 5,259,283.

[30] Foreign Application Priority Data

Jul. 4, 1991 [DE] Fed. Rep. of Germany ....... 4122110
Jun. 25, 1992 [DE] Fed. Rep. of Germany ....... 4220480

[51] Int. Cl.[5] ............................................ B60B 7/00
[52] U.S. Cl. .......................................... 83/347; 83/659
[58] Field of Search ................. 83/347, 346, 348, 658, 83/659

[56] References Cited

U.S. PATENT DOCUMENTS

| | | | |
|---|---|---|---|
| Re. 17,892 | 12/1930 | Wood . | |
| 1,601,335 | 9/1925 | Addison . | |
| 1,797,278 | 3/1931 | Weis et al. | 83/347 |
| 1,868,125 | 7/1932 | Tomlin . | |
| 1,977,283 | 10/1934 | Lundquist . | |
| 1,986,457 | 1/1937 | Wood . | |
| 2,405,598 | 8/1946 | Miller . | |
| 2,518,960 | 8/1950 | Tollison et al. | 83/347 |
| 2,680,484 | 6/1954 | Stuck | 83/659 |
| 3,602,970 | 9/1971 | Smith | 83/659 |
| 3,880,037 | 4/1975 | Duckett et al. . | |
| 4,031,600 | 6/1977 | Whigham | 83/347 |

FOREIGN PATENT DOCUMENTS

| | | |
|---|---|---|
| 1436520 | 3/1970 | Fed. Rep. of Germany . |
| 3318068 | 11/1984 | Fed. Rep. of Germany . |

*Primary Examiner*—Scott A. Smith
*Attorney, Agent, or Firm*—Jones, Tullar & Cooper

[57] ABSTRACT

A crosscutting device for a folder assembly utilizes a pair of cooperating cylinders. A cutting groove cylinder has at least one groove strip assembly on its periphery and cooperates with a cutter cylinder having a corresponding number of cutters. Each groove strip assembly includes a cutting groove component and a pressure spring component.

3 Claims, 3 Drawing Sheets

CROSSCUTTING DEVICE

This is a divisional of copending application(s) Ser. No. 07/907,070 filed Jul. 1, 1992 now U.S. Pat. No. 5,259,283.

FIELD OF THE INVENTION

The present invention is directed generally to a crosscutting device. More particularly, the present invention is directed to a crosscutting device in a folding unit. Most specifically, the present invention is directed to a crosscutting device in a folding unit of a rotary printing press. A cutter or cutter bar is positioned on the surface of a cutter cylinder and extends axially along the cutter cylinder. A cooperating cutter groove strip, which provides a support for the product being crosscut, is carried in the periphery of a cutting groove cylinder. The product to be crosscut passes between the cutter cylinder and the cutting groove cylinder. The edge of the cutter engages the product and in cooperation with the cutter groove strip separates the elongated product into a plurality of crosscut pieces.

DESCRIPTION OF THE PRIOR ART

In rotary printing machines, and particularly in web-fed rotary printing machines, the printed product is crosscut before it is folded into a folded product. This crosscutting of the printed web or sheet is typically accomplished by passing the stream of product through a crosscutting device which utilizes a crosscut blade or cutter that is carried by a cutter cylinder in cooperation with a somewhat resilient groove strip or other cooperating assembly that is carried in a groove cylinder.

One prior art device for cutting and transferring multi-layer products which are exiting from a rotary printing press is shown in German published, unexamined patent application No. DE-OS 1436520. This device utilizes a cutter cylinder and a groove cylinder. In devices of this type, the crosscutting device is situated in the folding unit and separates the stream or web of paper into a plurality of separate printed products. This prior art device consists of a cutting cylinder with an inserted cutter bar, and a groove cylinder which has a groove or groove collection strip into which cutter strips or groove strips are inserted. As the cutter cylinder and the groove cylinder rotate, the cutter engages the incoming stream or train of paper. Since the cutter bar extends radially out from the periphery or the surface of the cutter cylinder, a cutting edge portion of the cutter bar extends into the groove strip of the cutting groove cylinder. This cooperation between the cutter bar and the cutter groove strip separates or cuts the individual printed products from the tram or stream of paper. The depth of insertion or penetration of the cutting edge into the groove strip is determined by the shape of the cutting teeth on the cutting edge and by the distance which the cutter edge extends away from the surface of the cutter cylinder.

In a crosscutting device of the type discussed above, the edge of the cutter blade cannot roll or pivot in the groove strip in a manner similar to a toothed gear wheel during the cutting process since there is only a narrow aperture in the groove strip. This places large loads on the cutter blade and the groove strip during the cutting process. When the product being cut is quite thin, this problem of stresses on the cutter edge and the groove strip is solved because it is possible to use very resilient groove strips and cutter bars with thin cutters. This is because the cutting forces on these components are quite low. The cutter blades are somewhat like leaf springs when they are quite thin and their spring-like properties allow them to compensate for bending. Also, the very resilient groove strips can be deformed in the cutting groove without being destroyed. Furthermore, since the cutting forces generated by the cutting of thin products are quite low, it is possible to position highly resilient materials to the left and to the right of the cutter. The good spring properties of these highly resilient materials, result in these pressure strips not being pinched during the cutting operation.

During the production of thick products in the prior crosscutting devices, groove strips having very little resiliency and very rigid cutter blades, as well as non-resilient pressure strips are utilized. These pressure strips are pressed onto the product by means of coil springs. In these devices the large forces generated during the cutting operation are absorbed by the assembly. Since the assembly used to cut thick products is much stiffer, it suffers quicker and greater wear on the groove strip, the cutter, and the pressure strips than was the case in devices use to crosscut thin products.

In many crosscutting devices the apparatus must be used to cut both thick and thin products repeatedly. This means that the cutter bars, the groove strips, and the pressure strips must be changed repeatedly. The changing of these components necessarily requires a stoppage of the crosscutting device and a consequent loss of production.

It will be apparent that a need exists for a crosscutting device for a folder unit of a printing press which overcomes the limitations of the prior art devices. The crosscutting device in accordance with the present invention overcomes these limitations of the prior devices and provides a significant advance in the art.

SUMMARY OF THE INVENTION

It is an object of the present invention to provide a crosscutting device.

Another object of the present invention is to provide a crosscutting device for a folding unit.

A further object of the present invention is to provide a crosscutting device for a folding unit of a rotary printing press.

Yet another object of the present invention is to provide a crosscutting device which utilizes a cutter cylinder and a groove cylinder which resiliently supports groove strips.

Still a further object of the present invention is to provide a crosscutting cylinder that is usable for processing thick and thin materials to be cut.

As will be discussed in detail in the description of the preferred embodiments which are set forth subsequently, the crosscutting device in accordance with the present invention utilizes a cutter cylinder having an axially extending and radially projecting cutter blade, and a cutting groove cylinder which is provided with at least one groove strip assembly on its periphery. The groove strip assembly, which cooperates with the cutting edge of the cutter blade, includes a cutting groove component or part and a pressure spring component or part. The cutting groove and pressure spring are positioned circumferentially adjacent each other on the circumference of the cutting groove cylinder and the cutter is rigidly secured to the periphery of the cutter cylinder.

The multiple component groove strip assembly of the present crosscutting device provides several advantages over the prior art devices. Since the cutting groove component of the groove strip assembly is made of plastic that has little resiliency, a comparatively large resistance is provided to the cutter blade which is penetrating the material to be cut. This allows the cutter teeth of the cutter blade to fully enter the cutting groove component without the cutting groove component being able to move.

The use of a groove strip assembly with a pressure spring or resilient component, as provided by the present invention, allows the groove strip assembly to absorb the forces generated by any differences in speed between the cutter edge and the cutting groove component by means of compression of the resilient component during the cutting process. This greatly reduces the bending stress on the cutter and pinching of the pressure strips is prevented. This allows the crosscutting device to use thicker cutters which are more rigid and have a longer service life. Thinner products can also be cut more effectively by using the groove strip assembly of the crosscutting device of the present invention. The use of a resilient component also allows the use of materials for the cutting groove component which are resilient and more wear resistant. This increases the life of the cutting groove component without increasing cutting blade wear.

The crosscutting device in accordance with the present invention overcomes the limitations of the prior art devices and provides an assembly which provides greater cutting flexibility with fewer repairs. The crosscutting device provides a substantial advance in the art.

BRIEF DESCRIPTION OF THE DRAWINGS

While the novel features of the crosscutting device in accordance with the present invention are set forth with particularity in the appended claims, a full and complete understanding of the invention may be had by referring to the detailed description of the preferred embodiment which is set forth subsequently, and as illustrated in the accompanying drawings in which:

DESCRIPTION OF THE PREFERRED EMBODIMENT

Figure 1:
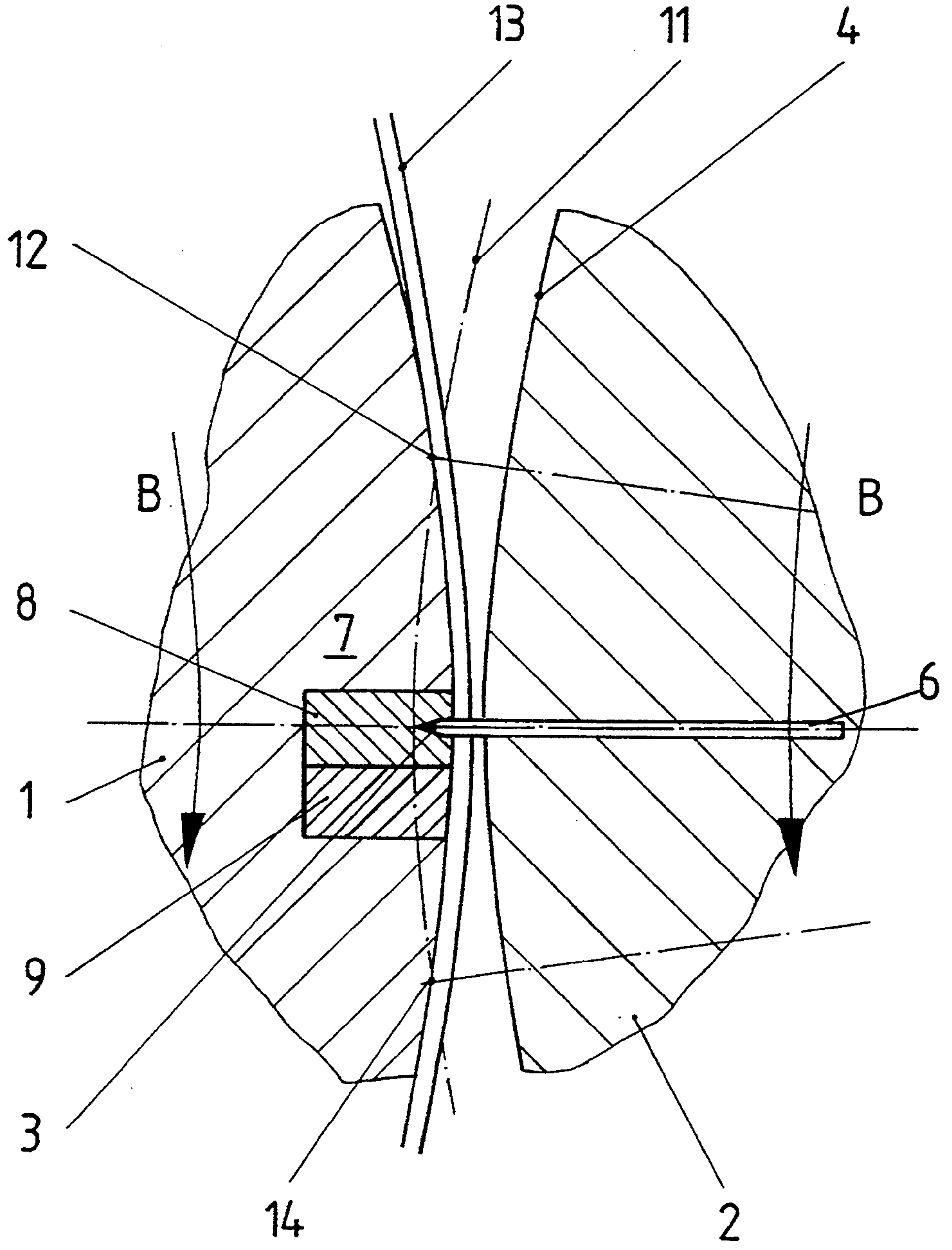
FIG. 1 is a cross-sectional view of a first preferred embodiment of a crosscutting device in accordance with the present invention with the cutter cylinder and the cutting groove cylinder both being only partly shown.

Referring initially to FIG. 1, there may be seen a vertical cross-sectional view through a crosscutting device in accordance with the present invention. A portion of a cutting groove cylinder 1 and a portion of a cooperating cutter cylinder 2 are shown with the remainder of the cylinders being omitted for clarity. The generally conventional pressure strips which are typically carried on the cutter cylinder 2 are also omitted for the sake of clarity. Both the cutting groove cylinder 1 and the cutter cylinder 2 rotate at generally the same peripheral speeds in the directions indicated by arrows B in FIG. 1.

The cutter cylinder 2 has a cutter 6 which has a cutting tip 3 that extends in a radial direction away from a peripheral surface 4 of cutter cylinder 2. The cutter 6 extends in the axial direction of the cutter cylinder 2 and is held in place on the cutter cylinder 2 by means of a generally well known cutter bar which is not specifically shown. It will be understood that several similar cutters 6 could be secured about the circumferential surface 4 of the cutter cylinder 2 and would cooperate with the cutting groove cylinder 1.

A groove strip assembly, generally at 7 is positioned in the periphery of the cutting groove cylinder 1 and extends generally parallel to an axis of rotation of the cutting groove cylinder 1. The groove strip assembly 7 is comprised of a cutting groove component 8 and a pressure spring or resilient component 9. The cutting groove component 8 and the resilient component 9 are positioned somewhat loosely next to each other in a suitable slot or channel in the surface of the cutting groove cylinder 1. These two components of the groove strip assembly are generally parallel to the axis of rotation of the cutting groove cylinder and are positioned so that the cutting groove component 8 is always situated first in the direction of rotation of the cutting groove cylinder 1, as indicated by the arrow B. Thus, as seen in FIG. 1, the cutting groove component 8 is first and the pressure spring or resilient component 9 is second. As the two cylinders 1 and 2 rotate in the direction indicated by arrows B, the radially outwardly projecting tip 3 of the cutter 6 traces the circular path indicated at 11 in FIG. 1. The cutter tip 3 thus initially makes contact with a train of product 13 at point 12 where the cutting process is initiated. The cutting of the product train 13 into a plurality of cut products is ended at point 14 which is the departure point of the cutter tip 3 from the several products.

The cutting groove component 8 of the groove strip assembly 7 of the crosscutting device of the present invention is preferably made of an elastomeric material such as polyurethane having a hardness between 90 and 95 Shore. In the first preferred embodiment depicted in FIG. 1, the pressure spring component 9 is formed of an elastomeric material, such as polyurethane having a hardness between 60 and 70 Shore, for example. During the cutting process, the pressure spring component 9 absorbs the forces generated by any difference in speed between the cutter edge 3 and the cutting groove component by compression. By means of this, the bending stress on the cutter 6 is sharply reduced and pinching of the pressure strips is prevented. The two components 8 and 9, can preferably be inserted, loosely touching, into the groove strip assembly 7. This has the advantage that only the cutting groove component 8, into which the cutter tips of cutter 6 enters, needs to be replaced since it is the only part subject to wear.

Figure 2:
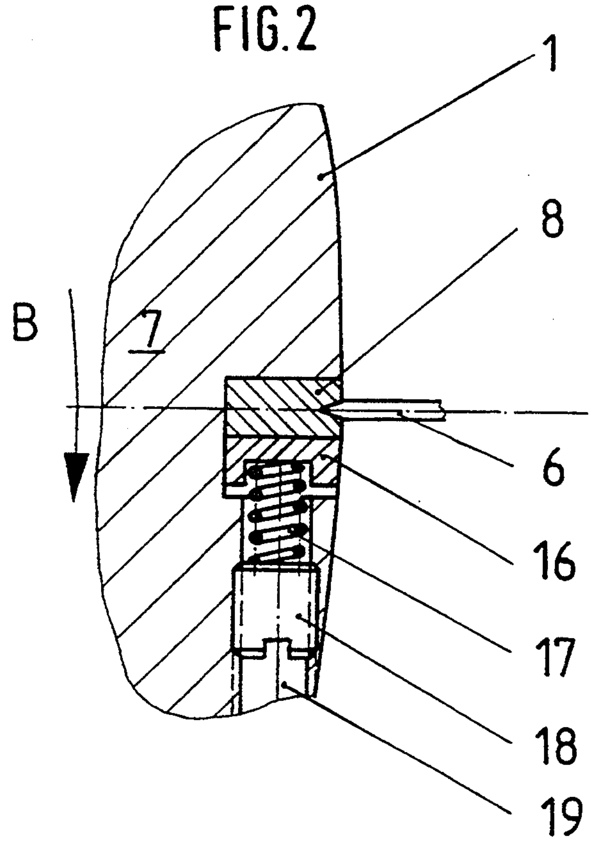
FIG. 2 is a cross-sectional view of a second preferred embodiment with the cutter cylinder omitted for clarity.

Turning now to FIG. 2, there may be seen a second preferred embodiment of a crosscutting device in accordance with the present invention. In this and subsequent preferred embodiments, the cutter cylinder 2 will not be depicted since in all embodiments, it is the same as shown and discussed in connection with FIG. 1. Similarly, in this and subsequent embodiments, the train of product 13 to be cut by the crosscutting device is not specifically shown, In this second preferred embodiment, the groove strip assembly 7 is made of two parts and consists of the cutting groove component 8 and a pressure spring or resilient component. In this second embodiment, the resilient component includes a brass body 16 which is biased toward the cutting groove component 8 by a pressure spring 17. This pressure spring 17 acts on the brass body 16 in a generally tangential direction opposite to the direction of rotation indicated by arrow B. The pressure spring 17 is adjustably disposed in a threaded bore 19 which extends tangentially to the cutting groove cylinder 1. A set screw 18 is placed in the threaded bore 19 to control the force exerted on the body 16 by the spring 17. A plurality of set screws 18 are positioned in a plurality of bores 1 and bias a plurality of pressure springs 17 along the entire length of the brass body 16 of the groove strip assembly 7 of the second preferred embodiment of the subject invention.

Figure 3:
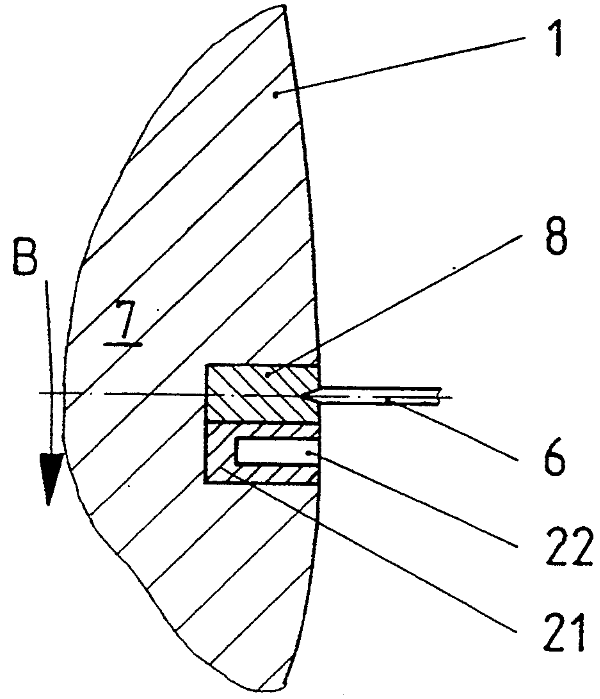
FIG. 3 is a cross-sectional view of a third preferred embodiment of the crosscutting device with the cutter cylinder omitted.

A third preferred embodiment of a crosscutting device in accordance with the present invention is shown in FIG. 3. In this third preferred embodiment, the groove strip assembly 7 is again made of two parts. In this embodiment, both parts are of the same material and include a cutting groove component 8 and a pressure spring component 21. A resilient element 22, which is generally rectangular in cross-section, and which may be generally wave-like or sinusoidal in its extension in the axial direction, is disposed in the pressure spring component 21. In this third preferred embodiment, the pressure spring component 21 is preferably made of a polyamide material. The resilient element 22 placed in the pressure spring or resilient component 21 can be made of steel, polyamide, or a similar resilient material. As was the case with the prior embodiments, the resilient component 21 exerts a force against the cutting groove component 8 so that the groove strip assembly 7 will operate effectively with the cutter tip 3 of the cutter blade 6.

Figure 4:
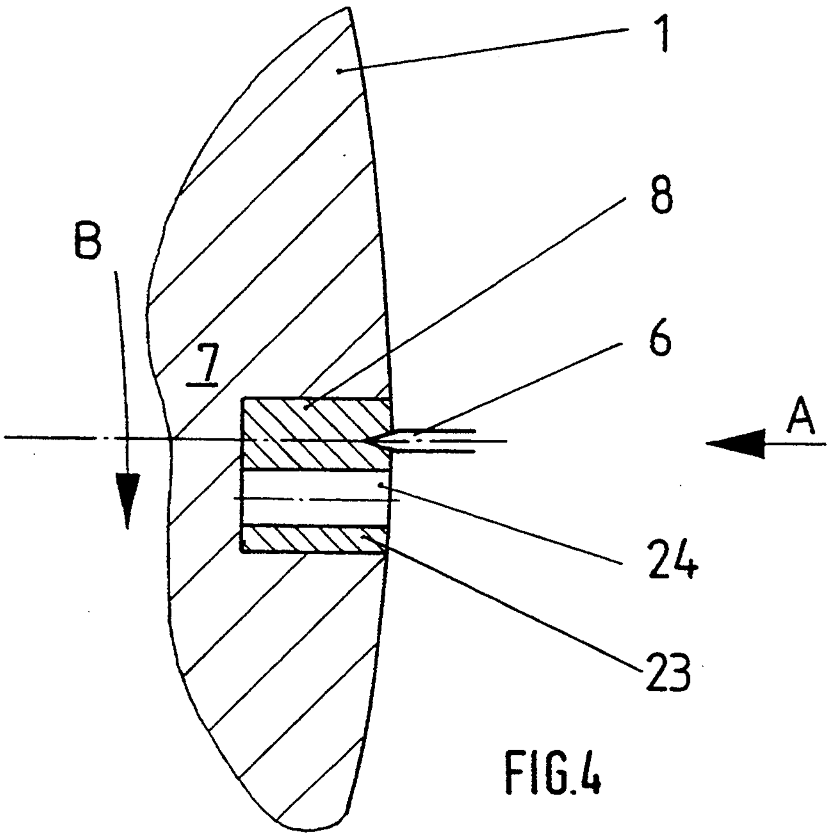
FIG. 4 is a cross-sectional view of a fourth preferred embodiment of the crosscutting device.
Figure 5:
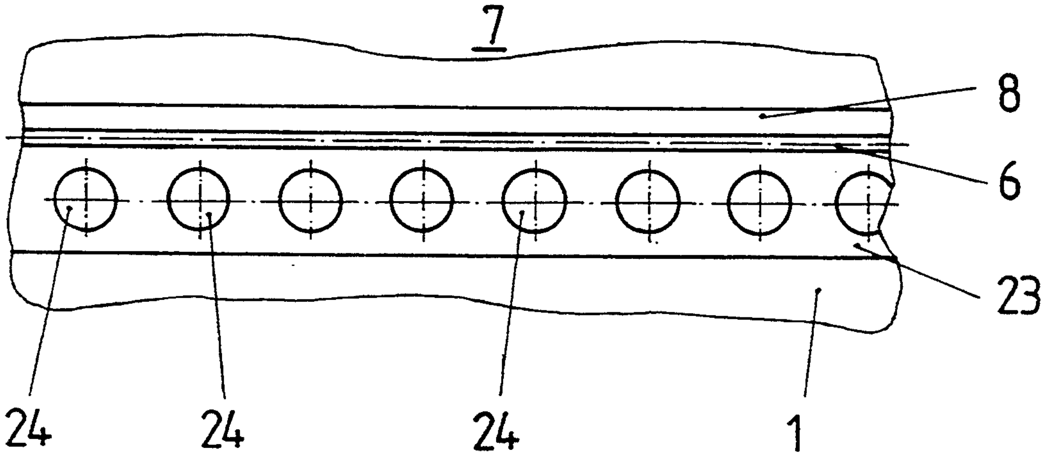
FIG. 5 is a partial side view of the crosscutting device of FIG. 4 taken in the direction of arrow A in FIG. 4.

Turning now to FIGS. 4 and 5, there may be seen a fourth preferred embodiment of a groove strip assembly 7 in accordance with the present invention. In FIG. 4 there is shown a cross-sectional view similar to FIGS. 1–3, whereas in FIG. 5 there is shown a view taken in the direction indicated by the arrow A in FIG. 4. In this fourth preferred embodiment, the groove strip assembly 7 is made of one or two parts with both parts being of the same material. The cutting groove component 8 and the pressure spring component 23 are fixedly in connection with each other. The pressure spring component 23 has a plurality of axially spaced holes or apertures 24. The spacing of these holes or apertures 24 can be varied based on the amount of resiliency required. Clearly, the greater the number of holes 24 and the closer they are together, the greater will be the resiliency of the pressure spring component 23.

In each of the several preferred embodiments of the crosscutting device of the present invention, the cutter 6 can have a thickness of between 2 and 3 mm. Products of up to 96 pages can be cut with the crosscutting device of the present invention.

Supplementary to FIG. 1 it is set out, that the groove strip assembly 7 is tightly enclosed in a groove, extending in radial direction away from the periphery, at least on three sides, namely on the underside and the two longitudinal edges and its fourth side, which means the upperside, is even with the periphery of the cutting groove cylinder 1. Looked at in the direction of rotation B of the cutting groove cylinder 1, there is arranged at first the "less elastic" cutting groove component 8 and adjacent to the same, there is arranged the "more elastic" pressure spring component 9. The cutting groove component 8 can be connected with the material of the pressure spring component 9, e.g. welded or pasted, or it can be connected form locked with the same. It is e.g. possible to tooth the cutting groove component 8 and the pressure spring component 9 with each other at the both adjacent longitudinal edges of the same. The groove strip assembly 7 is one-part executed and is more easily to be exchanged. The pressure spring component 9, arranged adjacent the cutting groove component 8, has approximately the same dimensions as the cutting groove component 8. The cutter 6 always strikes onto the free upperside of the harder cutting groove component 8, which can not escape in the radial direction to the axis of the cutting groove cylinder 1, as it presses itself against the bottom of the groove. A resilient escaping movement is only possible in direction of the pressure spring component 9, which has a lower modulus of elasticity, e.g. a modulus of elasticity, which is lower by 33 percent, compared with the modulus of elasticity of the groove strip assembly 7. Surprisingly, there only occurs a very slight wear of the cutter 6, being resistant to bending, so that a high endurance can be obtained. There can be cut thin as well as even thick products, or better, sections, in the same way.

Supplementary to FIG. 2 it is set out, that the brass body 16 has the function of a load distribution bar and can be of metal as well as of a hard plastic material and that pressure springs 17, supporting themselves on cylinder secured parts 18, press with a force of approximately 0.5 kilograms per centimeter of length of the brass body 16.

This force acts upon the pressure brass body 16, having the function of a load distribution bar, in the half depth of the groove along the longitudinal axis of the cylinder secured parts 18, which are supported. The line of influence of this force is in vertical direction to the prolongation of a second line of influence , extending in the radial direction on the axis of rotation of the cutting groove cylinder 1, on which the penetration of the cutter 6 in the upperside of the groove strip assembly takes place.

While preferred embodiments of a crosscutting device in accordance with the present invention have been set forth fully and completely hereinabove, it will be apparent to one of skill in the art that a number of changes in, for example the sizes of the cylinders, the specific type of drive means, the type of printed product being cross cut and the like can be made without departing from the true spirit and scope of the present invention which is accordingly to be limited only by the following claims.

What is claimed is:

1. A crosscutting device for a folder in a rotary printing press, said crosscutting device comprising:

a cutting cylinder having at least one rigid cutter blade with a cutter tip, said cutter blade extending radially outwardly from, and axially along a peripheral surface of said cutting cylinder;

a cutting groove cylinder cooperatively positioned with said cutting cylinder;

at least one axially extending groove having an underside and first and second longitudinal edges formed on a peripheral surface of said cutting groove cylinder; and at least one axially extending groove strip assembly enclosed in said at least one groove on said peripheral surface of said cutting groove cylinder, said at least one groove strip assembly including an axially extending cutting groove component having an upperside, and an axially extending resilient pressure spring component, said cutting groove component and said resilient pressure spring component being formed of the same material and being positioned circumferentially adjacent each other in said at least one axially extending groove on said peripheral surface of said cutting groove cylinder, said cutting groove component being situated before said resilient pressure spring component in said at least one groove in a direction of rotation of said cutting groove cylinder, said cutting groove component having a first resiliency, said resilient pressure spring component having a plurality of axially spaced apertures, said apertures being spaced to provide said resilient pressure spring component with a second resiliency which is greater than said first resiliency, said cutter tip contacting said upperside of said cutting groove component during crosscutting of a product passing between said cooperating cutting cylinder and said cutting groove cylinder, said resilient pressure spring component absorbing forces generated on said cutting groove component by contact between said cutter tip and said upperside of said cutting groove component.

2. The crosscutting device of claim 1 wherein said cutting groove component and said pressure spring component are in connection with each other.

3. The crosscutting device of claim 1 wherein said apertures in said resilient pressure spring component extend generally radially inwardly.

* * * * *